(12) United States Patent
Ma

(10) Patent No.: US 11,188,771 B2
(45) Date of Patent: Nov. 30, 2021

(54) LIVING-BODY DETECTION METHOD AND APPARATUS FOR FACE, AND COMPUTER READABLE MEDIUM

(71) Applicant: BEIJING BAIDU NETCOM SCIENCE AND TECHNOLOGY CO., LTD., Beijing (CN)

(72) Inventor: Caihong Ma, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/877,427

(22) Filed: May 18, 2020

(65) Prior Publication Data

US 2020/0372272 A1    Nov. 26, 2020

(30) Foreign Application Priority Data

May 20, 2019    (CN) .......................... 201910419412.1

(51) Int. Cl.
*G06K 9/00* (2006.01)
*G06T 7/246* (2017.01)

(52) U.S. Cl.
CPC ..... *G06K 9/00906* (2013.01); *G06K 9/00281* (2013.01); *G06T 7/246* (2017.01);
(Continued)

(58) Field of Classification Search
CPC .......... G06K 9/00906; G06K 9/00281; G06K 9/4652; G06K 9/00288; G06T 7/246; G06T 2207/10016; G06T 2207/30201
See application file for complete search history.

(56) References Cited

U.S. PATENT DOCUMENTS 9,928,603 B2 *  3/2018  Martin ............... G06K 9/00979
10,445,606 B2 * 10/2019  Rauhala ............. G06K 9/00604
(Continued)

FOREIGN PATENT DOCUMENTS

CN    102572217 A    7/2012
CN    103390152 A    11/2013
(Continued)

OTHER PUBLICATIONS

Chinese Patent Application No. 201910419412.1 First Office Action dated Dec. 18, 2020, 10 pages.
(Continued)

*Primary Examiner* — Wesley J Tucker
(74) *Attorney, Agent, or Firm* — Lathrop GPM LLP

(57) ABSTRACT

The present disclosure provides a living-body detection method for a face. The method includes: when an object to be detected is not illuminated by a reference light source, performing image collection on an area to be detected of the object to be detected to obtain a first image; performing illumination on the object to be detected by utilizing the reference light source, and performing image collection on the area to be detected of the object to be detected to obtain a second image; and judging whether there is a bright spot reflected by a cornea of the object to be detected according to a difference between the first image and the second image to generate a judged result, and determining whether the object to be detected is a non-living body according to the judged result.

11 Claims, 7 Drawing Sheets

(52) U.S. Cl.
CPC ............... *G06T 2207/10016* (2013.01); *G06T 2207/30201* (2013.01)

(56) References Cited

U.S. PATENT DOCUMENTS

| | | | | |
|---|---|---|---|---|
| 10,546,183 | B2* | 1/2020 | Rodriguez | G06K 9/00335 |
| 10,621,454 | B2* | 4/2020 | Fan | G06K 9/00288 |
| 2006/0279726 | A1* | 12/2006 | Galambos | G06K 9/00221 |
| | | | | 356/71 |
| 2013/0089241 | A1* | 4/2013 | Malhas | G06K 9/00906 |
| | | | | 382/117 |
| 2016/0117544 | A1* | 4/2016 | Hoyos | G06K 9/00604 |
| | | | | 348/78 |
| 2016/0125178 | A1* | 5/2016 | Danikhno | G06F 16/00 |
| | | | | 726/18 |
| 2016/0307038 | A1* | 10/2016 | Skogo | G06K 9/00604 |
| 2017/0061251 | A1 | 3/2017 | Fan et al. | |
| 2018/0350070 | A1* | 12/2018 | Ishii | G06K 9/00604 |
| 2019/0065722 | A1 | 2/2019 | Kaehler | |
| 2019/0392145 | A1* | 12/2019 | Komogortsev | G06F 21/32 |

FOREIGN PATENT DOCUMENTS

| | | | |
|---|---|---|---|
| CN | 105184246 | A | 12/2015 |
| CN | 105184277 | A | 12/2015 |
| CN | 105354545 | A | 2/2016 |
| CN | 105912986 | A | 8/2016 |
| CN | 107169429 | A | 9/2017 |
| CN | 107273794 | A | 10/2017 |
| CN | 108875469 | A | 11/2018 |
| CN | 108958577 | A | 12/2018 |
| CN | 109063674 | A | 12/2018 |
| CN | 109657531 | A | 4/2019 |
| JP | 2007072861 | A | 3/2007 |
| JP | 2014078052 | A | 5/2014 |
| JP | 2018504703 | A | 2/2018 |

OTHER PUBLICATIONS

Chinese Patent Application No. 201910419412.1 English translation of First Office Action dated Dec. 18, 2020, 10 pages.
Huang, H. et al., "A novel gaze tracking approach based on Purkinje image" Optical Technique, vol. 33, No. 4, Jul. 2007, pp. 498-500.
Ren, D. et al., "A Gaze Estimation Method Based on Normalized Eye Image" Acta Electronica Sinica, Mar. 2015, 43(3):536-543.
Japanese Patent Application No. 2020-088097 Office Action dated Jul. 13, 2021, 4 pages.
Japanese Patent Application No. 2020-088097 English translation of Office Action dated Jul. 13, 2021, 4 pages.

* cited by examiner

LIVING-BODY DETECTION METHOD AND APPARATUS FOR FACE, AND COMPUTER READABLE MEDIUM

CROSS-REFERENCE TO RELATED APPLICATION

The present application is based upon and claims priority to Chinese Patent Application No. 201910419412.1, filed on May 20, 2019, the entire contents of which are incorporated herein by reference.

FIELD

The present disclosure relates to a field of computer technologies, and more particularly to a living-body detection method and apparatus for a face, and a computer readable medium.

BACKGROUND

Presently, face recognition technology is used in areas where identity verification is required, such as in security checkpoint and during financial transactions. It is important to introduce live face detection technology when face recognition is performed in order to determine whether a target object is a true face, a real face or a fake face based on the acquired information of the target object.

SUMMARY

Embodiments of the present disclosure provide a living-body detection method and apparatus for a face, and a computer readable medium.

Embodiments of the present disclosure provide a living-body detection method for a face. The method includes: when an object to be detected is not illuminated by a reference light source, performing image collection on an area to be detected of the object to be detected to obtain a first image, the area to be detected at least including an eye of the object to be detected; performing illumination on the object to be detected by utilizing the reference light source, and performing image collection on the area to be detected of the object to be detected to obtain a second image; in which a position of the object to be detected during collecting the second image is the same as that of the detected object during collecting the first image; and judging whether there is a bright spot reflected by a cornea of the object to be detected according to a difference between the first image and the second image to generate a judged result, and determining whether the object to be detected is a non-living body according to the judged result.

Embodiments of the present disclosure further provide a living-body detection apparatus for a face. The apparatus includes: a reference light source, one or more processors, and a memory storing instructions executable by the one or more processors, in which the reference light source is configured to illuminate an object to be detected. The one or more processors are configured to: control the reference light source to be turned on and off; perform image collection on an area to be detected of the object to be detected to obtain a first image when the object to be detected is not illuminated by the reference light source, and to perform image collection on the area to be detected of the object to be detected to obtain a second image when the reference light source performs illumination on the object to be detected, in which the area to be detected at least includes an eye of the object to be detected, and a position of the object to be detected during collecting the second image is the same as that of the object to be detected during collecting the first image; judge whether there is a bright spot reflected by a cornea of the object to be detected according to a difference between the first image and the second image to generate a judged result, and to determine whether the object to be detected is a non-living body according to the judged result.

Embodiments of the present disclosure further provide a computer readable medium having a computer program stored thereon. A living-body detection method for a face is implemented when the computer program is executed, and the method may include: when an object to be detected is not illuminated by a reference light source, performing image collection on an area to be detected of the object to be detected to obtain a first image, the area to be detected at least comprising an eye of the object to be detected; performing illumination on the object to be detected by utilizing the reference light source, and performing image collection on the area to be detected of the object to be detected to obtain a second image; in which a position of the object to be detected during collecting the second image is the same as that of the detected object during collecting the first image; and judging whether there is a bright spot reflected by a cornea of the object to be detected according to a difference between the first image and the second image to generate a judged result, and determining whether the object to be detected is a non-living body according to the judged result.

BRIEF DESCRIPTION OF THE DRAWINGS

Accompanying drawings are used to provide a further understanding for embodiments of the present disclosure, and constitute a part of the specification. The accompanying drawings are also used to explain the present disclosure together with the embodiments of the present disclosure, and do not limit the present disclosure. Description is made to a specific embodiment with reference to the accompanying drawings. The above and other features and advantages will become apparent for the skilled in the art, in the accompanying drawings.

DETAILED DESCRIPTION

In order to enable the skilled in the art to understand the technical solution of the present disclosure better, a body detection method and an apparatus for a face, an electronic device and a computer readable medium according to the present disclosure will be described in detail below with reference to accompanying drawings.

Exemplary embodiments will be described fully below with reference to the accompanying drawings. However, the exemplary embodiments may be embodied in different forms and should not be construed as a limitation of embodiments described herein. On the contrary, these embodiments are provided to enable the present disclosure thorough and complete, and to enable the skilled in the art to fully understand the scope of the present disclosure.

As used herein, terms "and/or" include any and all combinations of one or more related enumerated items.

Terms used herein are intended only to describe a specific embodiment, and are not construed to limit the present disclosure. As used herein, "a" and "the" in singular forms mean including plural forms, unless clearly indicated in the context otherwise. It should be further understood that, when used in the specification, terms "comprising" and/or "including" specify the presence of stated features, entities, steps, operations, elements and/or components, but do not exclude the presence or addition of one or more other features, entities, steps, operations, elements, components and/or groups thereof.

The embodiments described herein may be described with reference to plan and/or cross-sectional schematic diagrams by means of ideal schematic diagrams of the present disclosure. Therefore, the exemplary diagram may be modified according to manufacturing techniques and/or tolerances. Embodiments are not limited to the embodiments illustrated in the accompanying drawings, but include modifications of configurations formed based on manufacturing processes. A region illustrated in the accompanying drawings has a schematic attribute, and a shape of the region illustrated in the accompanying drawings illustrates a specific shape of the region of an element, but are not intended to limit thereto.

Unless otherwise defined, all terms (including technical and scientific terms) used herein have the same meaning as commonly understood by the skilled in the art. It further should be understood that, the term such as that defined in a commonly used dictionary should be interpreted as having a meaning consistent with its meaning in the context of the related art and the present disclosure, and will not be interpreted as having an idealized or overly formal meaning unless explicitly defined herein.

Figure 1:
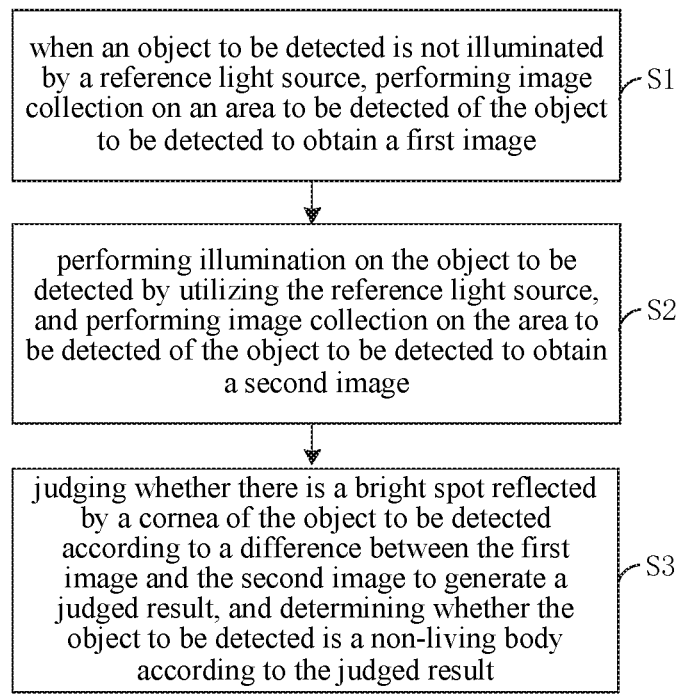
FIG. 1 is a flow chart illustrating a living-body detection method for a face according to an embodiment of the present disclosure.

FIG. 1 is a flow chart illustrating a living-body detection method for a face according to an embodiment of the present disclosure. The method may be executed by a living-body detection apparatus for a face. The apparatus may be implemented in form of software or hardware. The apparatus may be integrated in an electronic device. As illustrated in FIG. 1, the method includes the following.

At block S1, when an object to be detected is not illuminated by a reference light source, image collection is performed on an area to be detected of the object to be detected to obtain a first image. The area to be detected at least includes an eye of the object to be detected.

The object to be detected refers to an object whose face is used for the living-body detection. The object to be detected may be a living object, i.e., a real face. The object to be detected may be a non-living body object, which may be a malicious fake face attack such as a printed face image, a digital face image in an electronic device screen, a 3-dimension face simulation model, etc. The eye is an area including at least a black and white eyeball.

A procedure for the image collection may be executed via an image collector such as a camera. When the image collection is performed on the face, an entire face may be obtained, or an area in the face including the eye may be obtained.

The reference light source is a light source disposed at a position with a certain distance around the camera and having a fixed position. When the reference light source is turned on, a light of the reference light source may irradiate the object to be detected, and when the object to be detected is the real face, a bright spot may be generated on a cornea of the eye of the object to be detected. The reference light source may be an infrared light source.

At block S2, illumination is performed on the object to be detected by utilizing the reference light source, and image collection is performed on the area to be detected of the object to be detected, to obtain a second image. A position of the object to be detected during collecting the second image is the same as that of the object to be detected during collecting the first image.

In some alternative implementations of this embodiment, a first reminding message may be generated before the actions at block S1, to remind the object to be detected to keep a head motionless. The first reminding message may include a speech reminding message and/or a text reminding message.

At block S3, it is judged whether there is a bright spot reflected by a cornea of the object to be detected according to a difference between the first image and the second image to generate a judged result, and it is determined whether the object to be detected is a non-living body according to the judged result.

The bright spot is a spot with greater brightness. The difference between the first image and the second image may be a difference between the pixel values of respective pixel points. The first image and the second image may be grayscale images. In this case, the pixel value may be a grayscale value of each pixel point, and the bright spot may be a spot on the black eyeball which is larger than a certain gray value (e.g., 120). The first image and the second image may also be color images. In the case, the pixel value may be a weighted sum of a R value, a B value and a G value of each pixel point.

The bright spot is reflected on an outer surface of the cornea by light from the reference light source entering the pupil. Therefore, when the object to be detected is the living body and is not illuminated by the reference light source, the bright spot does not appear at the eye, or a lighter bright spot appears at the eye. In this case, the bright spot may not appear at the eye in the first image. When the object to be detected is the living body and is illuminated by the reference light source, the bright spot appears at the eye. When the object to be detected is the non-living body, such as, the printed face image, the digital face image, the 3-dimension face simulation model, etc., if the eye of the non-living body has a spot with a lighter color (for example, a spot which is added to the eye of the digital face image by image processing), the spot always exists after and before the object to be detected is illuminated. In this case, it is not sufficient to use the difference between the first image and the second image to determine the location of the bright spot (that is, a judged result at block S3 is that there is no bright spot reflected by the cornea of the object to be detected). If there is no spot with a lighter color in the eye of the non-living body, the object to be detected does not have the bright spot before and after being illuminated. In this case, it is not sufficient to use the difference between the first image and the second image to determine the location of the bright spot reflected by the cornea of the object to be detected.

In this embodiment, the bright spot in the cornea is generated by the cornea of the face of the living-body under illumination. Therefore, it is judged whether the bright spot is generated according to the difference between images of the object to be detected before and after the illumination, which may recognize the non-living body as far as possible, and reduce or prevent malicious attacks during face recognition. The method in this embodiment has less calculation amount and is easy to be implemented.

In some alternative implementation of the present disclosure, the bright spot reflected by the cornea of the object to be detected is a Purkinje image.

Figure 2:
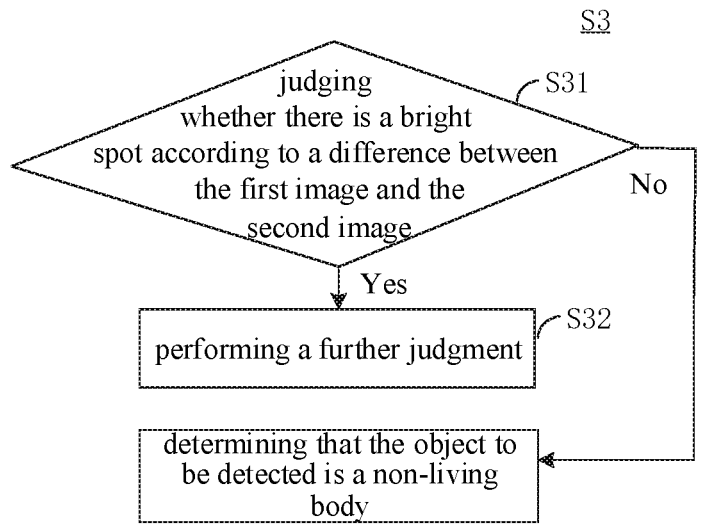
FIG. 2 is a flow chart illustrating an alternative implementation of block S3 in the present disclosure.

FIG. 2 is a flow chart illustrating an alternative implementation of block S3 in the present disclosure. As illustrated in FIG. 2, actions at block S3 include the following.

At block S31, it is judged whether there is the bright spot according to the difference between the first image and the second image. It is determined that the object to be detected is the non-living body when there is no bright spot. When it is judged that there is the bright spot, actions at block S32 are executed.

In some alternative implementations of this embodiment, a procedure for judging whether there is the bright spot according to the difference between the first image and the second image includes: calculating a difference image between the first image and the second image; judging whether there is a pixel point in the difference image, in which a pixel value of the pixel point is greater than a preset pixel value and a distance between the pixel point and the pupil is smaller than a preset distance; determining that there is the bright spot when there is the pixel point in the difference image; and otherwise, determining that there is no bright spot.

The preset pixel value and the preset distance may be set based on actual needs. For example, the difference image may be a grayscale image, the preset pixel value may be range from 100 to 150, and the preset distance may be ⅔ of a radius of the black eyeball.

When the object to be detected is the living body, there is a larger pixel value in the difference image corresponding to the pixel value of the bright spot, while there is a smaller pixel value in the eyeball except for the bright spot. Therefore, when the pixel value in the difference image is greater than the preset pixel value, there is a bright spot with higher brightness on the eyeball. In addition, when a noise light source (such as, a light source located on the top of the object to be detected) appears during an actual detection, the light source also produces reflective spots (i.e., noise spots) on the eyeball, and these noise spots are far away from the pupil. Therefore, the noise spots may be filtered out by judging whether there is the pixel point in the difference image whose pixel value is greater than the preset pixel value and whose distance from the pupil region is smaller than the preset distance value.

At block S32, a further judgment is performed.

Figure 3:
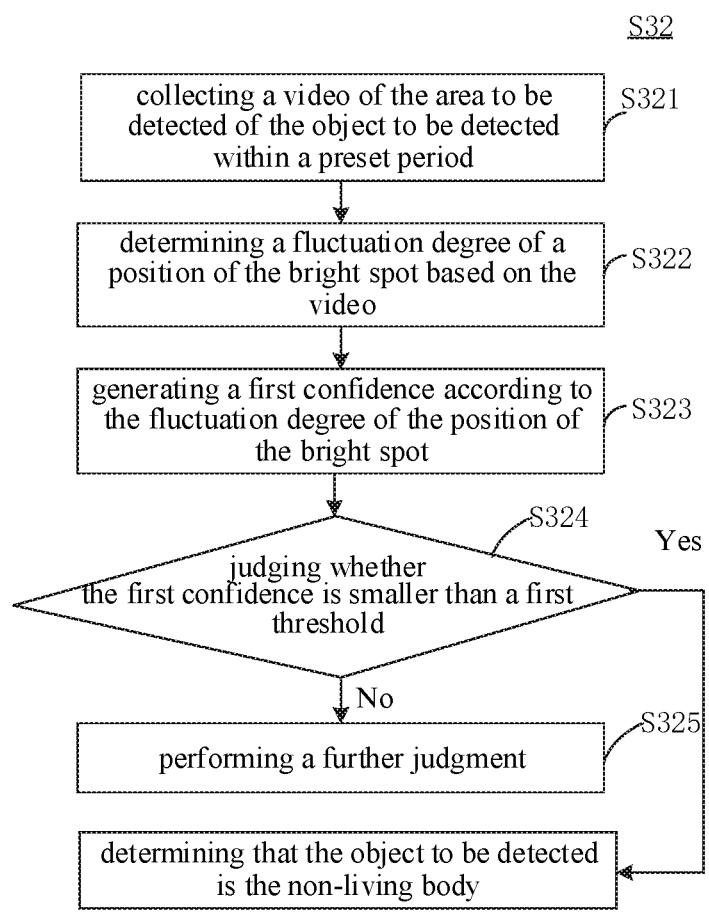
FIG. 3 is a flow chart illustrating an alternative implementation of block S32 in the present disclosure.

FIG. 3 is a flow chart illustrating an alternative implementation of block S32 in the present disclosure. As illustrated in FIG. 3, the action at block S32 include the following.

At block S321, a video of the area to be detected of the object to be detected is collected within a preset period.

The video of the area to be detected within the preset period may be: a plurality of sequential images obtained by performing image collection on the area to be detected with a higher frequency (such as, 10-60 times per second).

It should be noted that, at block S321 and subsequent blocks, the reference light source keeps illuminating the object to be detected.

At block S322, a fluctuation degree of a position of the bright spot is determined based on the video.

The position of the bright spot is a coordinate of a center of the bright spot (i.e., an area corresponding to the bright spot in the image) in each image of the video.

In each image frame of the video, the position of the bright spot may be determined according to a difference between pixel information of the bright spot and pixel information of a position around the bright spot. For example, when a pixel value of a pixel point in a certain area is greater than the first preset pixel value (such as, a gray scale is 200), and the pixel value of each pixel point in a certain range around the area is smaller than a second preset pixel value (such as, the gray scale is 50), the area is the position of the bright spot. Alternatively, the black eyeball may be determined according to a contour feature of the eye, a position of each pixel point in the black eyeball may be detected, in which the pixel value of each pixel point is greater than the first preset pixel value, and an area formed by the pixel points is the area of the bright spot.

The fluctuation degree of the position of the bright spot is used to represent a change of the position of the bright spot. The greater the fluctuation degree, the greater the change of the position of the bright spot in each image of the face. The smaller the fluctuation degree, the smaller the change of the position of the bright spot in each image of the face.

The fluctuation degree of the position of the bright spot may be represented by the following parameters: a ratio of a size of the fluctuation area to a size of the black eyeball, in which the size of the fluctuation area is formed when the position of the bright spot fluctuates, or an Euclidean distance between two positions farthest away. The fluctuation degree may also be represented by other parameters.

At block S323, a first confidence is generated according to the fluctuation degree of the position of the bright spot during the preset period.

The first confidence is a value ranges from 0 to 1, and is inversely related to the fluctuation degree of the position of the bright spot within the preset period.

At block S324, it is judged whether the first confidence is smaller than a first threshold. It is determined that the object to be detected is the non-living body when the first confidence is smaller than the first threshold; otherwise, the action at block S325 is executed.

At block S325, a further judgment is performed.

The first threshold may be determined based on an actual condition. For example, the ratio (represented as A, A is between 0.05 and 1) of the size of the fluctuation area of the bright spot to the size of the black eyeball is taken as the fluctuation degree of the position of the bright spot. The first confidence is set to 1/(20*A), and the first threshold is set to 0.5.

A movement track of the bright spot (i.e., Purkinje spot) reflected by the cornea of the face of the living body is characterized as: when the relative positions of the camera, the reference light source and the face are unchanged, the positions of the pupil and the eyeball are also changed correspondingly with a change of a gaze direction of the eye, while the position of the bright spot is relatively unchanged. Therefore, when the fluctuation degree of the position of the bright spot is large enough (i.e., the first confidence is small enough), it is determined that the object to be detected may be the non-living object, thereby recognizing the non-living object more likely, and further improving the detection accuracy.

Figure 4:
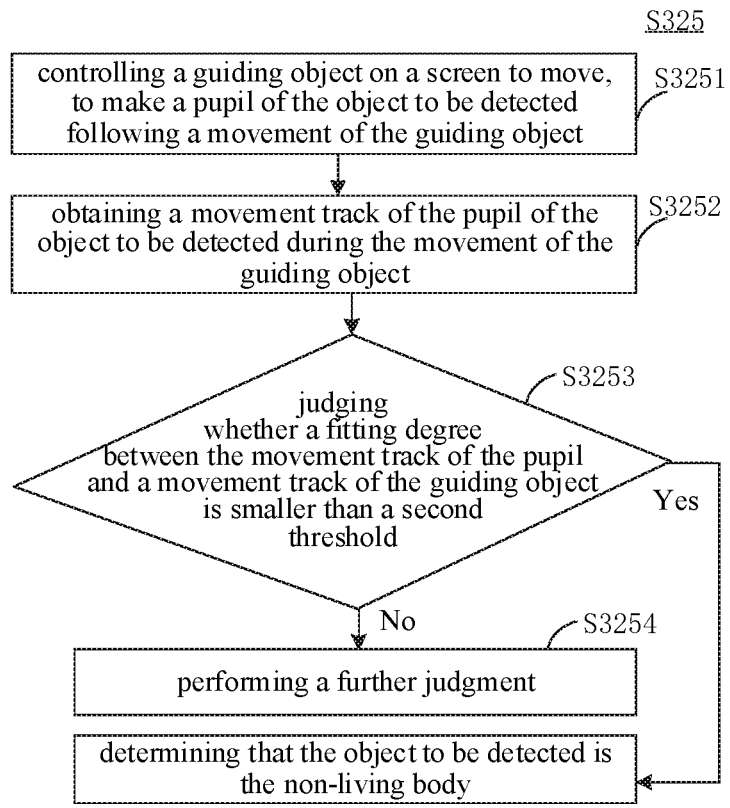
FIG. 4 is a flow chart illustrating an alternative implementation of block S325 in the present disclosure.

FIG. 4 is a flow chart illustrating an alternative implementation of block S325 in the present disclosure. As illustrated in FIG. 4, actions at block S325 include the following.

At block S3251, a guiding object on a screen is controlled to move, to make the pupil of the object to be detected following a movement of the guiding object.

The screen is disposed at a position close to the reference light source and the camera, and an orientation of the screen is the same as that of the reference light source, such that the object to be detected may see the guiding object displayed on the screen when receiving illumination from the reference light source.

In addition, the guiding object may move following a fixed track, and may also move following a track set randomly.

In addition, at block S3251, the guiding object in the screen moves while a second reminding message may be generated, to remind the head of the object to be detected to remain motionless and to remind the eye to fix on the guiding object on the screen. The second reminding message may be a speech reminding message and/or a text reminding message.

At block S3252, a movement track of the pupil of the object to be detected is obtained during the movement of the guiding object.

The movement track of the pupil may be obtained according to an existing target tracking method.

At block S3253, it is judged whether a fitting degree between the movement track of the pupil and a movement track of the guiding object is smaller than a second threshold. It is determined that the object to be detected is the non-living body when the fitting degree is smaller than the second threshold; otherwise, actions at block S3254 are executed.

The fitting degree between the movement track of the pupil and the movement track of the guiding object refers to a similarity between the movement track of the pupil and the movement track of the guiding object. The second threshold may be determined based on an actual condition, such as 50%.

At block S3254, a further judgment is performed.

Based on the living-body detection method for a face of this embodiment, the living-body detection is performed according to the bright spot generated by the cornea of the object to be detected under illumination, and the pupil of the object to be detected moves following the movement of the guiding object on the screen, thereby recognizing the non-living body object more possibly and improving the detection accuracy.

Figure 5:
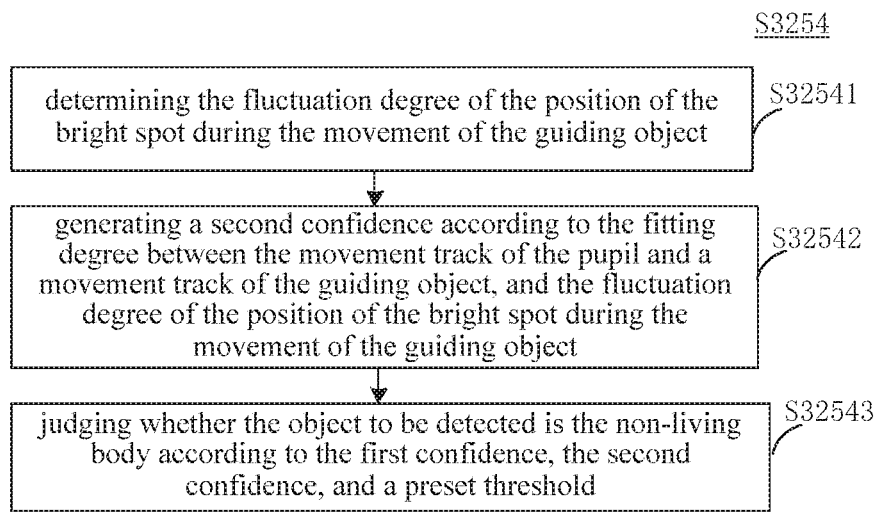
FIG. 5 is a flow chart illustrating an alternative implementation of block S3254 in the present disclosure.

FIG. 5 is a flow chart illustrating an alternative implementation of block S3254 in the present disclosure. As illustrated in FIG. 5, actions at block S3254 include the following.

At block S32541, the fluctuation degree of the position of the bright spot is determined during the movement of the guiding object.

At block S32542, a second confidence is generated according to the fitting degree between the movement track of the pupil and a movement track of the guiding object, and the fluctuation degree of the position of the bright spot during the movement of the guiding object.

The second confidence is inversely related to the fluctuation degree of the position of the bright spot during the movement of the guiding object, and is positively related to the fitting degree between the movement track of the pupil and the movement track of the guiding object.

At block S32543, it is judged whether the object to be detected is the non-living body according to the first confidence, the second confidence, and a preset threshold.

In some alternative implementation of this embodiment, the preset threshold includes a third threshold.

Figure 6:
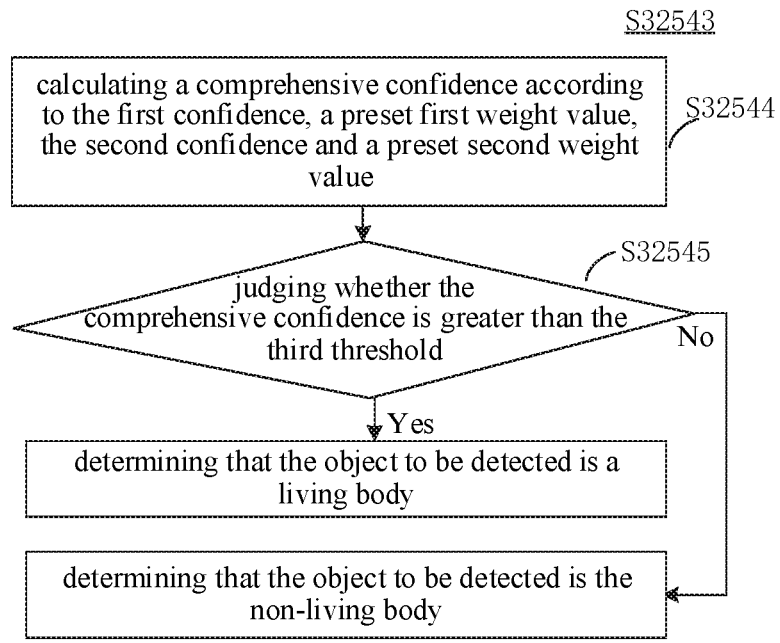
FIG. 6 is a flow chart illustrating an alternative implementation of block S32543 in the present disclosure.

FIG. 6 is a flow chart illustrating an alternative implementation of block S32543 in the present disclosure. As illustrated in FIG. 6, actions at block S32543 include the following.

At block S32544, a comprehensive confidence is calculated according to the first confidence, a preset first weight value, the second confidence and a preset second weight value.

The preset second weight value is greater than the preset first weight value.

At block S32545, it is judged whether the comprehensive confidence is greater than the third threshold. It is determined that the object to be detected is a living body when the comprehensive confidence is greater than the third threshold; otherwise, it is determined that the object to be detected is the non-living body.

Other methods may also be employed to determine whether the object to be detected is the living body at block S32545. For example, the preset threshold includes two thresholds corresponding to the first confidence and the second confidence. When both the first confidence and the second confidence are greater than their corresponding thresholds, it is determined that the object to be detected is the living body; otherwise, it is determined that the object to be detected is the non-living body.

With the method of this embodiment, the living body detection is performed according to the first confidence and the second confidence, which may further recognize the non-living body object and further improve the detection accuracy. The method has a small amount of computation, good robustness and easy implementation.

Figure 7:
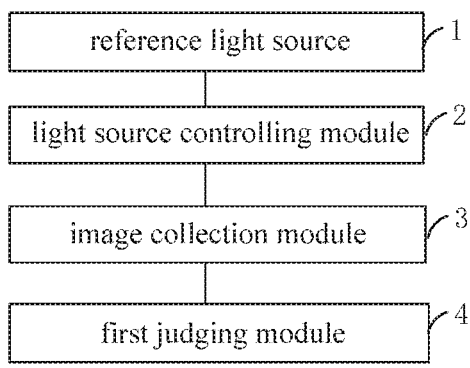
FIG. 7 is a block diagram illustrating a living-body detection apparatus for a face according to an embodiment of the present disclosure.

FIG. 7 is a block diagram illustrating a living-body detection apparatus for a face according to embodiments of the present disclosure. The apparatus may be applied to implement the living-body detection method for a face according to the above embodiments. As illustrated in FIG. 7, the apparatus includes: a reference light source 1, a light source controlling module 2, an image collection module 3, and a first judging module 4.

The reference light source 1 is configured to illuminate an object to be detected.

The light source controlling module 2 is configured to control the reference light source to be turned on and off.

The image collection module 3 is configured to perform image collection on an area to be detected of the object to be detected to obtain a first image when the object to be detected is not illuminated by the reference light source (i.e., the light source controlling module 2 controls the reference light source 1 to be turned off), and to perform image collection on the area to be detected of the object to be detected to obtain a second image when the reference light source 1 performs illumination on the object to be detected (i.e., the light source controlling module 2 controls the reference light source 1 to be turned on), in which the area to be detected at least includes an eye of the object to be detected, and a position of the object to be detected during collecting the second image is the same as that of the object to be detected during collecting the first image.

The first judging module 4 is configured to judge whether there is a bright spot reflected by a cornea of the object to be detected according to a difference between the first image and the second image to generate a judged result, and to determine whether the object to be detected is a non-living body according to the judged result.

In some alternative implementation of the present disclosure, the bright spot reflected by the cornea of the object to be detected is a Purkinje image.

The first judging module 4 is configured to determine that the object to be detected is the non-living body in response to judging that there is no bright spot (i.e., the Purkinje spot) according to the difference between the first image and the second image.

Figure 8:
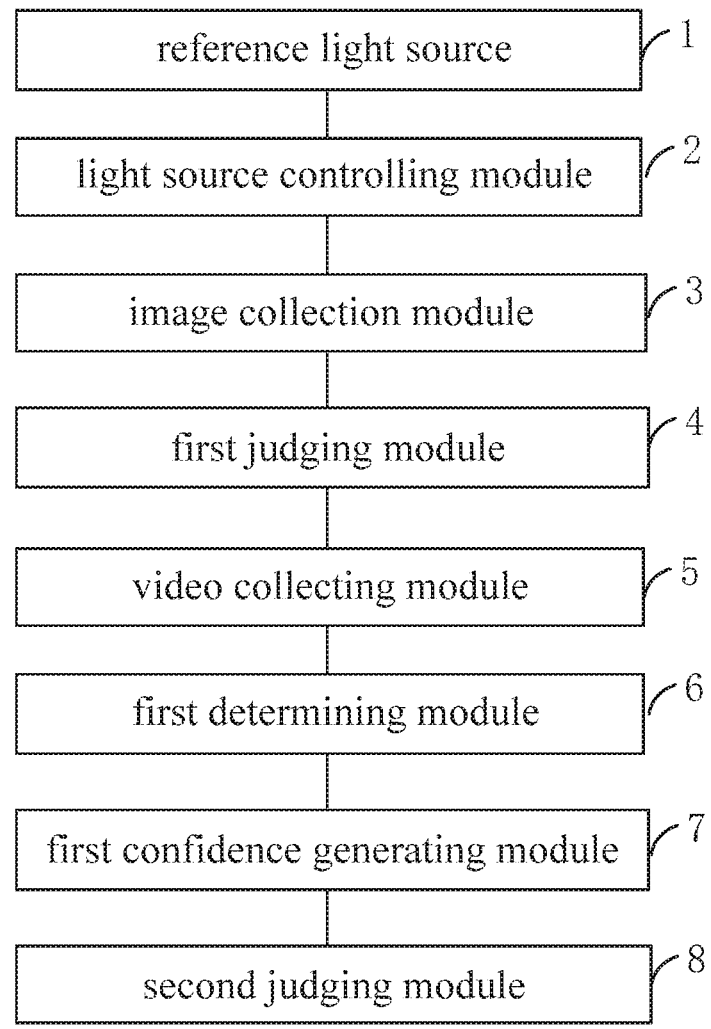
FIG. 8 is a block diagram illustrating a living-body detection apparatus for a face according to another embodiment of the present disclosure.

FIG. 8 is a block diagram illustrating a living-body detection apparatus for a face according to another embodiment of the present disclosure. As illustrated in FIG. 8, different from the above embodiment, the apparatus further includes a video collecting module 5, a first determining module 6, a first confidence generating module 7, and a second judging module 8.

The video collecting module 5 is configured to collect a video of the area to be detected of the object to be detected within a preset period when the first judging module 4 judges that there is the bright spot.

The first determining module 6 is configured to determine a fluctuation degree of a position of the bright spot based on the video.

The first confidence generating module 7 is configured to generate a first confidence according to the fluctuation degree of the position of the bright spot.

In some alternative implementation of this embodiment, the first confidence is inversely related to the fluctuation degree of the position of the bright spot within the preset period.

The second judging module 8 is configured to judge whether the first confidence is smaller than a first threshold, in which it is determined that the object to be detected is the non-living body in response to judging that the first confidence is smaller than the first threshold.

Figure 9:
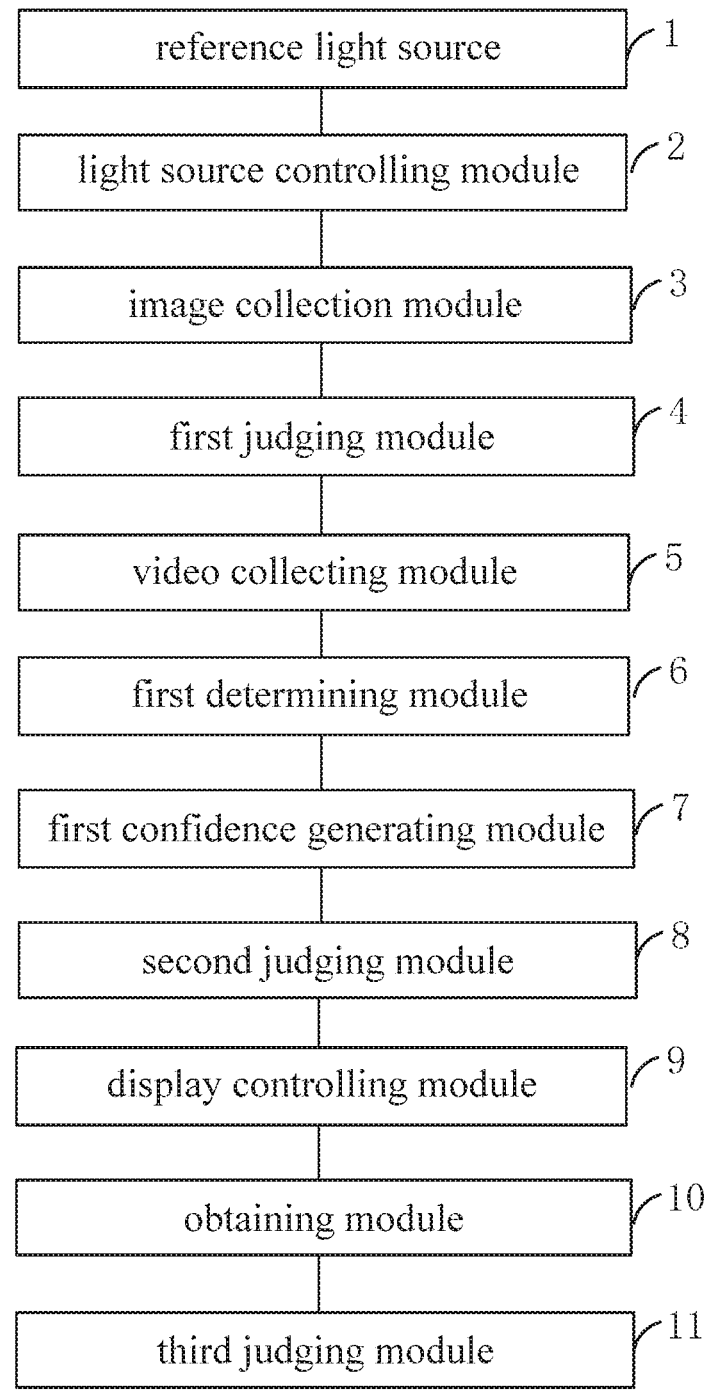
FIG. 9 is a block diagram illustrating a living-body detection apparatus for a face according to yet another embodiment of the present disclosure.

FIG. 9 is a block diagram illustrating a living-body detection apparatus for a face according to another embodiment of the present disclosure. As illustrated in FIG. 9, on the basis of the above embodiment, the apparatus also includes: a display controlling module 9, an obtaining module 10, and a third judging module 11.

The display controlling module 9 is configured to, when the second judging module 8 judges that the first confidence is greater than or equal to the first threshold, control a guiding object on a screen to move, to make a pupil of the object to be detected following a movement of the guiding object.

The obtaining module 10 is configured to obtain a movement track of the pupil of the object to be detected during the movement of the guiding object.

The third judging module 11 is configured to judge whether a fitting degree between the movement track of the pupil and a movement track of the guiding object is smaller than a second threshold, in which it is determined that the object to be detected is the non-living body in response to judging that the fitting degree is smaller than the second threshold.

Figure 10:
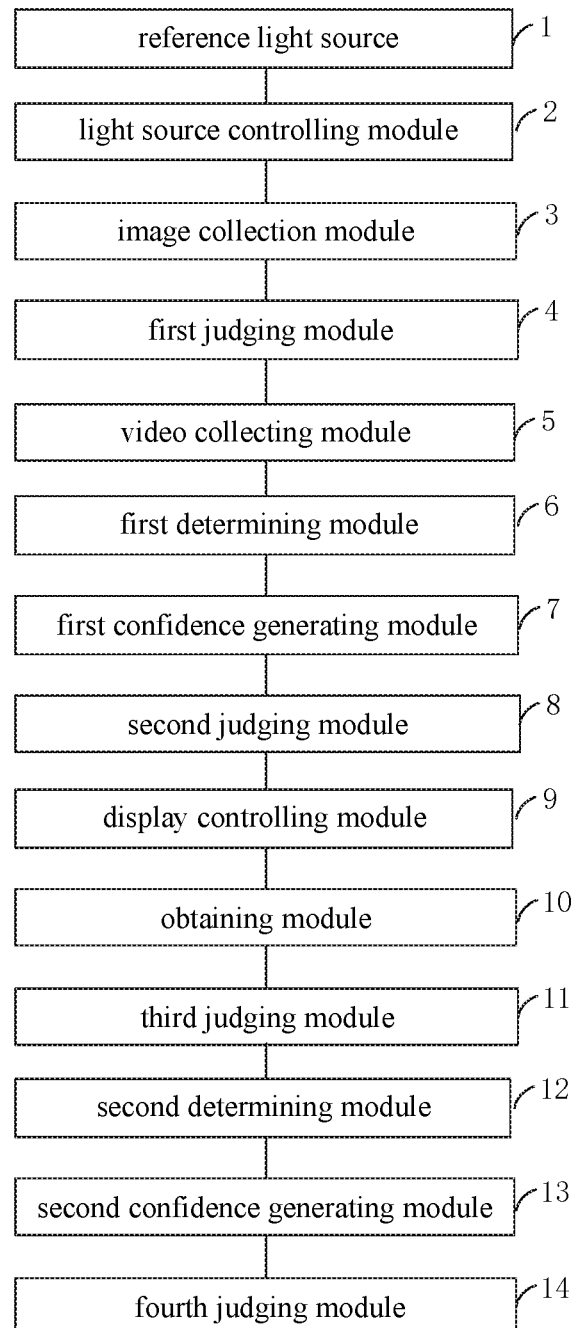
FIG. 10 is a block diagram illustrating a living-body detection apparatus for a face according to still another embodiment of the present disclosure.

FIG. 10 is a block diagram illustrating a living-body detection apparatus for a face according to another embodiment of the present disclosure. As illustrated in FIG. 10, on the basis of the above embodiment, the apparatus also includes: a second determining module 12, a second confidence generating module 13, and a fourth judging module 14.

The second determining module 12 is configured to determine the fluctuation degree of the position of the bright spot during the movement of the guiding object when the third judging module 11 judges that the fitting degree between the movement track of the pupil and the movement track of the guiding object is greater than or equal to the second threshold.

The second confidence generating module 13 is configured to generate a second confidence according to the fitting degree between the movement track of the pupil and a movement track of the guiding object, and the fluctuation degree of the position of the bright spot during the movement of the guiding object.

In some alternative implementations of this embodiment, the second confidence is inversely related to the fluctuation degree of the position of the bright spot during the movement of the guiding object, and is positively related to the fitting degree between the movement track of the pupil and the movement track of the guiding object.

The fourth judging module 14 is configured to judge whether the object to be detected is the non-living body according to the first confidence, the second confidence, and a preset threshold.

Figure 11:
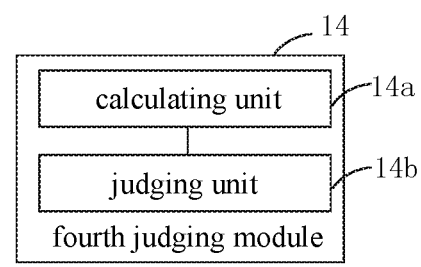
FIG. 11 is a block diagram illustrating an alternative implementation of a fourth judging module in the present disclosure.

FIG. 11 is a block diagram illustrating an alternative implementation of the fourth judging module in the present disclosure. As illustrated in FIG. 11, the fourth judging module 14 includes: a calculating unit 14*a* and a judging unit 14*b*.

The calculating unit 14*a* is configured to calculate a comprehensive confidence according to the first confidence, a preset first weight value, the second confidence and a preset second weight value.

The judging unit 14*b* is configured to judge whether the comprehensive confidence is greater than the third threshold, in which, it is determined that the object to be detected is a living body in response to judging that the comprehensive confidence is greater than the third threshold; and it is determined that the object to be detected is the non-living body in response to judging that the comprehensive confidence is smaller than or equal to the third threshold.

Description for implementation details and technical effects of the above modules and units may refer to the description for the above method embodiments, which is not repeated here.

Embodiments of the present disclosure further provide an electronic device. The electronic device includes: one or more processors; and a storage device. The storage device has one or more programs stored thereon. When the one or more programs are executed by the one or more processors, the one or more processors are caused to implement the living-body detection method for a face according to the above embodiments.

Embodiments of the present disclosure further provide a computer readable medium having a computer program stored thereon. The living-body detection method for a face according to the above embodiments is implemented when being executed by the computer program.

It should be understood by the skilled in the art that, all or some of the steps in the above method, and functional modules/units in the system and apparatus may be implemented as software, firmware, hardware, and appropriate combinations thereof. In a hardware implementation, the division among the functional modules/units mentioned above does not necessarily correspond to the division of physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as a specific integrated circuit. Such software may be distributed on computer readable media, which may include computer storage media (or non-transitory media) and communication media (or transitory media). As is well known to the skilled in the art, the term "computer storage medium" includes volatile and nonvolatile, removable and non-removable media implemented in any method or technology for storing information (such as computer readable instructions, data structures, program modules or other data). The computer storage media includes, but is not limited to, a RAM (random access memory), a ROM (read only memory), an EEPROM (electrically erasable programmable read-only memory), a flash memory or other memory technologies, a CD-ROM (compact disc read only memory), a DVD (digital versatile disk) or other optical disk storage, a magnetic cassette, a magnetic tape, a magnetic disk storage or other magnetic storage devices, or any other media that may be used to store desired information and may be accessed by a computer. Furthermore, it is well known to the skilled in the art that, the communication media generally includes computer readable instructions, a data structure, program modules, or other data in a modulated data signal such as a carrier wave or other transmission mechanism, and may include any information delivery medium.

Although exemplary embodiments disclosed by the present disclosure employ specific terms, the specific terms should only be interpreted as a generic and descriptive sense and not for purposes of limitation. In some embodiments, it is apparent to the skilled in the art that, unless explicitly stated otherwise, the features, characteristics, and/or elements described in connection with a particular embodiment may be used alone, the features, characteristics, and/or elements described in connection with other embodiment may be used in combination with other embodiments. Therefore, it should be understood by the skilled in the art that various changes in form and details may be made without departing from the scope of the present disclosure in the appended claims.

What is claimed is:

1. A living-body detection method for a face, comprising:
   when an object to be detected is not illuminated by a reference light source, performing image collection on an area to be detected of the object to be detected to obtain a first image, the area to be detected at least comprising an eye of the object to be detected;
   performing illumination on the object to be detected by utilizing the reference light source, and performing image collection on the area to be detected of the object to be detected to obtain a second image; wherein a position of the object to be detected during collecting the second image is the same as that of the detected object during collecting the first image; and
   judging whether there is a bright spot reflected by a cornea of the object to be detected according to a difference between the first image and the second image to generate a judged result, and determining whether the object to be detected is a non-living body according to the judged result,
   wherein in response to judging that there is the bright spot according to the difference between the first image and the second image, the method further comprises:
   collecting a video of the area to be detected of the object to be detected within a preset period;
   determining a fluctuation degree of a position of the bright spot based on the video;
   generating a first confidence according to the fluctuation degree of the position of the bright spot;
   judging whether the first confidence is smaller than a first threshold; and
   determining that the object to be detected is the non-living body in response to judging that the first confidence is smaller than the first threshold; and
   in response to judging that the first confidence is greater than or equal to the first threshold, the method further comprises:
   controlling a guiding object on a screen to move, to make a pupil of the object to be detected following a movement of the guiding object;
   obtaining a movement track of the pupil of the object to be detected during the movement of the guiding object;
   judging whether a fitting degree between the movement track of the pupil and a movement track of the guiding object is smaller than a second threshold; and
   determining that the object to be detected is the non-living body in response to judging that the fitting degree is smaller than the second threshold.

2. The method of claim 1, wherein determining whether the object to be detected is the non-living body according to the judged result comprises:
   determining that the object to be detected is the non-living body in response to determining that there is no bright spot according to the difference between the first image and the second image.

3. The method of claim 1, wherein in response to judging whether that the fitting degree between the movement track of the pupil and the movement track of the guiding object is greater than or equal to the second threshold, the method further comprises:
   determining the fluctuation degree of the position of the bright spot during the movement of the guiding object;
   generating a second confidence according to the fitting degree between the movement track of the pupil and a movement track of the guiding object, and the fluctuation degree of the position of the bright spot during the movement of the guiding object; and
   judging whether the object to be detected is the non-living body according to the first confidence, the second confidence, and a preset threshold.

4. The method of claim 3, wherein the preset threshold comprises a third threshold; and
   judging whether the object to be detected is the non-living body according to the first confidence, the second confidence, and the preset threshold comprises:
   calculating a comprehensive confidence according to the first confidence, a preset first weight value, the second confidence and a preset second weight value;

judging whether the comprehensive confidence is greater than the third threshold;
determining that the object to be detected is a living body in response to judging that the comprehensive confidence is greater than the third threshold; and
determining that the object to be detected is the non-living body in response to judging that the comprehensive confidence is smaller than or equal to the third threshold.

5. The method of claim 1, wherein the bright spot is a Purkinje image.

6. A living-body detection apparatus for a face, comprising a reference light source, one or more processors, and a memory storing instructions executable by the one or more processors;
wherein:
the reference light source is configured to illuminate an object to be detected; and
the one or more processors are configured to:
control the reference light source to be turned on and off;
perform image collection on an area to be detected of the object to be detected to obtain a first image when the object to be detected is not illuminated by the reference light source, and to perform image collection on the area to be detected of the object to be detected to obtain a second image when the reference light source performs illumination on the object to be detected, wherein the area to be detected at least comprises an eye of the object to be detected, and a position of the object to be detected during collecting the second image is the same as that of the object to be detected during collecting the first image; and
judge whether there is a bright spot reflected by a cornea of the object to be detected according to a difference between the first image and the second image to generate a judged result, and to determine whether the object to be detected is a non-living body according to the judged result,
wherein the one or more processors are configured to:
collect a video of the area to be detected of the object to be detected within a preset period when the first judging module judges that there is the bright spot;
determine a fluctuation degree of a position of the bright spot based on the video;
generate a first confidence according to the fluctuation degree of the position of the bright spot; and
judge whether the first confidence is smaller than a first threshold, wherein it is determined that the object to be detected is the non-living body in response to judging that the first confidence is smaller than the first threshold;
when the second judging module judges that the first confidence is greater than or equal to the first threshold, control a guiding object on a screen to move, to make a pupil of the object to be detected following a movement of the guiding object;
obtain a movement track of the pupil of the object to be detected during the movement of the guiding object; and
judge whether a fitting degree between the movement track of the pupil and a movement track of the guiding object is smaller than a second threshold, wherein it is determined that the object to be detected is the non-living body in response to judging that the fitting degree is smaller than the second threshold.

7. The apparatus of claim 6, wherein the one or more processors are configured to determine that the object to be detected is the non-living body in response to judging that there is no bright spot according to the difference between the first image and the second image.

8. The apparatus of claim 6, wherein the one or more processors are configured to:
determine the fluctuation degree of the position of the bright spot during the movement of the guiding object when the third judging module judges that the fitting degree between the movement track of the pupil and the movement track of the guiding object is greater than or equal to the second threshold;
generate a second confidence according to the fitting degree between the movement track of the pupil and a movement track of the guiding object, and the fluctuation degree of the position of the bright spot during the movement of the guiding object; and
judge whether the object to be detected is the non-living body according to the first confidence, the second confidence, and a preset threshold.

9. The apparatus of claim 8, wherein the preset threshold comprises a third threshold; and the one or more processors are configured to:
calculate a comprehensive confidence according to the first confidence, a preset first weight value, the second confidence and a preset second weight value; and
judge whether the comprehensive confidence is greater than the third threshold, wherein it is determined that the object to be detected is a living body in response to judging that the comprehensive confidence is greater than the third threshold; and it is determined that the object to be detected is the non-living body in response to judging that the comprehensive confidence is smaller than or equal to the third threshold.

10. The apparatus of claim 6, wherein the bright spot is a Purkinje image.

11. A non-transitory computer readable medium having a computer program stored thereon, wherein a living-body detection method for a face is implemented when the computer program is executed, and the method comprises:
when an object to be detected is not illuminated by a reference light source, performing image collection on an area to be detected of the object to be detected to obtain a first image, the area to be detected at least comprising an eye of the object to be detected;
performing illumination on the object to be detected by utilizing the reference light source, and performing image collection on the area to be detected of the object to be detected to obtain a second image; wherein a position of the object to be detected during collecting the second image is the same as that of the detected object during collecting the first image; and
judging whether there is a bright spot reflected by a cornea of the object to be detected according to a difference between the first image and the second image to generate a judged result, and determining whether the object to be detected is a non-living body according to the judged result,
wherein in response to judging that there is the bright spot according to the difference between the first image and the second image, the method further comprises:
collecting a video of the area to be detected of the object to be detected within a preset period;
determining a fluctuation degree of a position of the bright spot based on the video;

generating a first confidence according to the fluctuation degree of the position of the bright spot;
judging whether the first confidence is smaller than a first threshold; and
determining that the object to be detected is the non-living body in response to judging that the first confidence is smaller than the first threshold; and
in response to judging that the first confidence is greater than or equal to the first threshold, the method further comprises:
controlling a guiding object on a screen to move, to make a pupil of the object to be detected following a movement of the guiding object;
obtaining a movement track of the pupil of the object to be detected during the movement of the guiding object;
judging whether a fitting degree between the movement track of the pupil and a movement track of the guiding object is smaller than a second threshold; and
determining that the object to be detected is the non-living body in response to judging that the fitting degree is smaller than the second threshold.

* * * * *